(12) United States Patent
Helgee et al.

(10) Patent No.: US 7,527,747 B2
(45) Date of Patent: May 5, 2009

(54) LIQUID CRYSTAL DEVICE AND A METHOD FOR MANUFACTURING THEREOF

(75) Inventors: Bertil Helgee, Västra Frölunda (SE); Lachezar Komitov, Göteborg (SE)

(73) Assignee: Ecsibeo PPFI AB, Göteborg (SE)

( * ) Notice: Subject to any disclaimer, the term of this patent is extended or adjusted under 35 U.S.C. 154(b) by 140 days.

(21) Appl. No.: 11/628,026

(22) PCT Filed: Jun. 8, 2005

(86) PCT No.: PCT/EP2005/006145
§ 371 (c)(1), (2), (4) Date: Jan. 18, 2007

(87) PCT Pub. No.: WO2005/121883
PCT Pub. Date: Dec. 22, 2005

(65) Prior Publication Data
US 2008/0043190 A1    Feb. 21, 2008

(30) Foreign Application Priority Data
Jun. 9, 2004    (EP) ................... 04013592

(51) Int. Cl.
C09K 19/00   (2006.01)
C09K 19/06   (2006.01)
C09K 19/52   (2006.01)

(52) U.S. Cl. .............. 252/299.01; 252/299.5; 252/299.63; 430/20; 428/1.1; 428/1.2; 428/1.3

(58) Field of Classification Search .......... 428/1.1–1.3; 430/20; 252/299.01, 299.5, 299.63
See application file for complete search history.

(56) References Cited

U.S. PATENT DOCUMENTS

2007/0098918 A1 *  5/2007  Komitov et al. .............. 428/1.1

FOREIGN PATENT DOCUMENTS

| GB | 2249309 A | 5/1992 |
|---|---|---|
| WO | WO 89/09203 A | 10/1989 |
| WO | WO 00/03288 A | 1/2000 |
| WO | WO 02/44801 A2 | 6/2002 |
| WO | WO 03/081326 A1 | 10/2003 |

OTHER PUBLICATIONS

G. Galli et al., "The Mesophase Structure of Chiral Liquid Crystalline Polysiloxanes for Electro-Optical Applications", Molecular Crystals and Liquid Crystals, vol. 360, 2001, pp. 147-160 (XP008037974).
Komitov L., "Electrically Commanded Surfaces: A New Liquid-Crystal-Display Concept", Journal of the Society for Information Display, vol. 11, No. 3, pp. 437-441. (XP002303748).

* cited by examiner

*Primary Examiner*—Geraldina Visconti
(74) *Attorney, Agent, or Firm*—Buchanan Ingersoll & Rooney PC

(57) ABSTRACT

The invention relates to a liquid crystal device comprising a liquid crystal bulk layer and a dynamic surface-director alignment layer, wherein the liquid crystal bulk layer comprises a liquid crystalline material possessing a phase sequence consisting of isotropic phase, nematic phase and optionally crystalline phase(s), and the surface-director alignment layer comprises a chiral smectic liquid crystalline polysiloxane. The invention also relates to a method for its manufacturing.

17 Claims, 3 Drawing Sheets

LIQUID CRYSTAL DEVICE AND A METHOD FOR MANUFACTURING THEREOF

BACKGROUND

1. Field

The present disclosure generally relates to the field of liquid crystals. More specifically, the present disclosure relates to a liquid crystal device comprising at least one confining substrate, a liquid crystal bulk layer presenting a surface-director at a bulk surface thereof, wherein an orthogonal projection of said surface-director on said substrate, termed projected surface-director, presents a preferred orientation in a geometrical plane parallel to said substrate, termed preferred in-plane orientation, and a surface-director alignment layer comprising a chiral smectic liquid crystalline material arranged to interact with the bulk layer at said bulk surface, said surface-director alignment layer being a dynamic alignment layer directly controllable by an applied electric field to perform an in-plane switching in the surface-director alignment layer for accomplishing, as a direct consequence of this in-plane switching and the interaction at the bulk surface, an in-plane switching of said preferred in-plane orientation of the projected surface-director.

The disclosure also relates to a method for manufacturing said liquid crystal device.

2. Description of Related Art

The published international patent application No. WO 00/03288 describes the so-called ECS (Electrically Commanded Surfaces) principle.

According to the ECS principle, a separate thin liquid crystalline polymer layer, such as a chiral smectic liquid crystalline polymer layer, preferably a ferroelectric (chiral smectic C phase, SmC*) liquid crystalline polymer layer, is deposited on the inner surface(s) of one or both of the substrates confining a liquid crystal bulk material in a conventional sandwich cell.

The chiral smectic liquid crystalline polymer layer acts as a surface-director alignment layer imposing a planar or substantially planar alignment on the adjacent liquid crystal bulk material. More specifically, when applying an external electric field across the cell—and thereby across the surface-director alignment layer—the molecules in the separate chiral smectic liquid crystalline polymer layer will switch. The change of the dynamic surface-director alignment layer in response to the electric field is referred to as the "primary surface switching". This primary surface switching results in its turn, via elastic forces (steric coupling), in a switching of the preferred molecular orientation within the bulk volume of the liquid crystal bulk material confined between the substrates. This secondary switching is referred to as the "induced bulk switching". This induced bulk switching is an in-plane switching. Thus, the molecular switching in the dynamic surface-director alignment layer will be transmitted into the bulk volume via elastic forces at the boundary between the separate surface-director alignment layer and the bulk layer, thus resulting in a relatively fast in-plane switching of the bulk volume molecules mediated by the dynamic surface-director alignment layer.

Normally, the electric field would be applied across the entire cell, including the liquid crystal bulk layer, but as far as the basic principle of the ECS principle is concerned, any presence of the electric field over the liquid crystal bulk layer is not of primary importance, although in certain applications such presence may be useful.

The chiral smectic liquid crystalline polymer layer, i.e. the dynamic surface-director alignment layer, may be a chiral smectic C (SmC* or SmC$_A$*) material or a chiral smectic A (SmA*) material. Thus, the response of the dynamic surface-director alignment layer to an applied electric field may be ferroelectric, antiferroelectric or paraelectric, respectively.

The ECS layer should preferably be very thin (100-200 nm). Furthermore, in order to keep the ECS layer and its operation intact, the material of ECS layer should be insoluble in the liquid crystal bulk material.

The use of an ECS layer in a liquid crystal device provides a fast in-plane switching and a comparatively high image contrast. However, it would be desirable to improve the contrast even further.

SUMMARY

Disclosed herein is an improved liquid crystal device. In particular, disclosed herein is a liquid crystal device exhibiting a fast in-plane switching and an improved image contrast. The disclosed device is not directed to displays only, but may be useful in many other liquid crystal devices as well.

According to a first aspect disclosed herein, there is provided a liquid crystal device comprising at least one confining substrate, a liquid crystal bulk layer presenting a surface-director at a bulk surface thereof, wherein an orthogonal projection of said surface-director on said substrate, termed projected surface-director, presents a preferred orientation in a geometrical plane parallel to said substrate, termed preferred in-plane orientation, and a surface-director alignment layer comprising a chiral smectic liquid crystalline material arranged to interact with the bulk layer at said bulk surface, said surface-director alignment layer being a dynamic alignment layer directly controllable by an applied electric field to perform an in-plane switching in the surface-director alignment layer for accomplishing, as a direct consequence of this in-plane switching and the interaction at the bulk surface, an in-plane switching of said preferred in-plane orientation of the projected surface-director, wherein the liquid crystal bulk layer comprises a liquid crystalline material possessing a phase sequence consisting of isotropic phase, nematic phase and optionally crystalline phase(s), and the surface-director alignment layer comprises a chiral smectic liquid crystalline polysiloxane.

According to a second aspect disclosed herein, there is provided a method for manufacturing a liquid crystal device, said method comprising the steps of providing a dynamic surface-director alignment layer comprising a chiral smectic liquid crystalline polysiloxane on an inner surface of at least one substrate, wherein the thus provided surface-director alignment layer is directly controllable by an electric field to perform an in-plane switching in the surface-director alignment layer, and sandwiching a liquid crystal bulk layer comprising a liquid crystalline material possessing a phase sequence consisting of isotropic phase, nematic phase and optionally crystalline phase(s) between two substrates, at least one of which is provided with said surface-director alignment layer, arranged so that said surface-director alignment layer(s) is (are) interacting with the liquid crystal bulk layer at a bulk surface thereof.

Other features and advantages disclosed herein will become apparent from the following drawings and detailed description of specific embodiments, which are not intended to limit the scope of the appended claims.

DETAILED DESCRIPTION OF SPECIFIC EMBODIMENTS

Figure 1A:
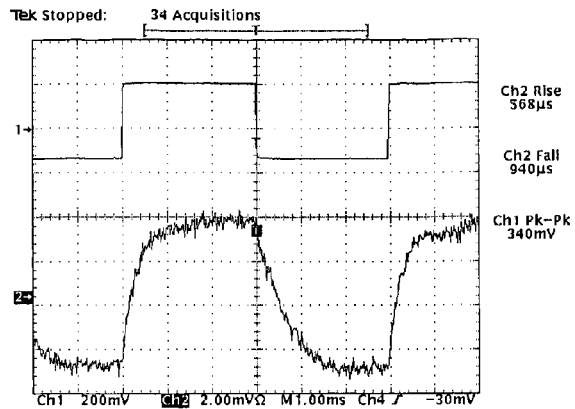
FIG. 1a-c shows the electro-optical response of the cell described in Example 1.

Liquid crystal molecules are generally long rod-like molecules, so-called calamitic molecules, which have the ability to align along their long axis in a certain preferred direction (orientation). The average direction of the molecules is specified by a vector quantity and is called director. It shall be noted, however, that there also exist liquid crystal molecules that are disc-like, so-called discotic molecules.

Nematics is the simplest liquid crystalline structure, i.e. an anisotropic liquid. In a nematic material, the molecules are aligned toward a particular direction in space but the centre of mass of molecules is not ordered.

If the molecules stay within a layer, a smectic liquid crystalline structure is formed, i.e. the molecules are arranged in adjacent smectic layers.

Smectic A and smectic C phases are the two most important representatives of these "layered" liquid crystals.

Smectic A phase is the simplest smectic structure having an average direction of the molecules perpendicular ($\beta=0°$) to the smectic layer normal, i.e. the molecules are directed along the smectic layer normal.

In a smectic C phase structure, the molecules are inclined with an angle $\beta$ (typically in the order of 22.5°) with respect to the smectic layer normal. Smectic C phase structures are also referred to as tilted smectic phase structures.

There are two types of molecular order for smectic C phase structures; synclinic (SmC*/SmC) and anticlinic (SmC$_A$*/SmC$_A$) phase structure.

In a synclinic smectic C liquid crystalline structure, the molecules of two adjacent layers are tilted in the same direction with respect to the smectic layer normal.

In an anticlinic smectic C liquid crystalline structure, the molecules of two adjacent layers are tilted in the opposite direction with respect to the smectic layer normal.

Furthermore, a smectic liquid crystal can be achiral (e.g. SmA, SmC or SmC$_A$) or chiral (e.g. SmA*, SmC* or SmC$_A$*), where the term chiral means lack of mirror symmetry. It should be noted that the term "chiral" does not refer to the occurrence of a twisted or helical molecular arrangement that may or may not appear as a secondary effect as a result of the chirality of the material.

A chiral smectic liquid crystal possesses a director that rotates in a cone in going from one smectic layer to the next. The apex angle $\theta=2\beta$ of the cone may typically be in the order of 45°. Thereby, a helix texture is formed across the layers with the helix axis being perpendicular to the smectic layers and parallel to the axis of said cone. However, the local spontaneous polarisation ($P_s$) which is coupled to the director will then also turn around in a helical fashion, with the same period or pitch. Such a helical structure of the local polarisation means that the local polarisation is self-cancelling, i.e. the bulk liquid crystal will present no macroscopic polarisation.

Now, if an electric field is applied to a synclinic smectic C* liquid crystalline structure, the electric field will couple to the permanent dipoles and align them with the field direction. In other words, the applied field will unwind the helix and create an induced macroscopic polarisation of the bulk liquid crystal and the response to the applied field will be a so-called ferroelectric response.

In an anticlinic smectic C* liquid crystalline structure, the spontaneous polarisation in adjacent layers is in opposite direction and therefore in average cancels out and the total structure will present no macroscopic polarisation. If an electric field is applied to this structure, a so-called antiferroelectric response will be given. However, if the applied electric field is above a certain threshold, the anticlinic structure will be transformed to synclinic structure, i.e. a ferroelectric response to the applied electric field will be provided.

If an electric field is applied to a smectic A* liquid crystalline structure, the response to the applied field will be a so-called paraelectric response. The paraelectric response is a consequence of a field-induced molecular tilt resulting in a field-induced polarisation ($P_i$).

A common phase sequence for a liquid crystalline material is the following:

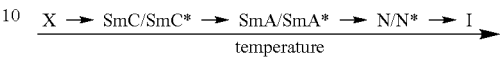

$$X \rightarrow SmC/SmC^* \rightarrow SmA/SmA^* \rightarrow N/N^* \rightarrow I$$
$$\text{temperature} \longrightarrow$$

wherein X denotes crystalline phase(s), N denotes a nematic liquid crystalline phase and I denotes an isotropic liquid phase.

Figure 3A:
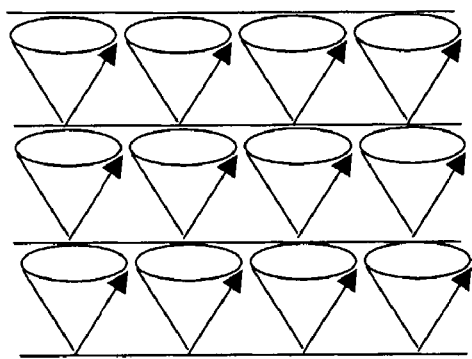
FIG. 3a shows an ordinary SmC* phase and FIG. 3b shows a random SmC* phase (De Vries).
Figure 3B:
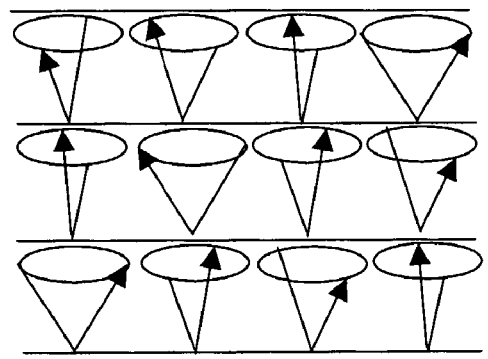

In materials exhibiting SmA/SmA* and SmC/SmC* phases, the molecular tilt is, as explained above, essentially zero degrees in the SmA/SmA* phase (i.e. essentially no molecular tilt exists) and non-zero degrees in the SmC/SmC* phase (i.e. molecular tilt exists). Thus, in most cases a shrinkage of the smectic layer thickness occurs during the SmA/SmA*–SmC/SmC* phase transition. The exact relationship between molecular tilting transitions and layer thickness changes is, however, still not fully understood and different materials show varying degrees of shrinkage as a result of this tilting transition. In fact, a number of ferroelectric materials exhibit a virtually constant smectic layer thickness during the transition from SmA* to SmC* phase. The SmA* phase of these materials is called random SmC* phase or "de Vries phase". In the random SmC* phase the molecules in the smectic layers are tilted, but their tilting directions (C-director) from layer to layer are randomly distributed, i.e. the molecules have a large but uncorrelated tilt as shown in FIG. 3b. As comparison, FIG. 3a shows an ordinary SmC* phase. Thus, the de Vries phase behaves as optically uniaxial with its optic axis directed along the smectic layer normal. Due to the random tilt distribution this phase has a zero spontaneous polarization. However, application of an external electric field over the material causes a deformation of the disordered distribution, i.e. some order is induced, which result in the appearance of an apparent tilt and, hence, a macroscopic polarization.

As used herein, the term chiral smectic A (SmA*) liquid crystalline material, such as chiral smectic A (SmA*) liquid crystalline polysiloxane, includes random chiral smectic C (random SmC*) liquid crystalline materials, such as random chiral smectic C (random SmC*) polysiloxanes.

Disclosed herein is a liquid crystal device comprising at least one confining substrate, a liquid crystal bulk layer presenting a surface-director at a bulk surface thereof, wherein an orthogonal projection of said surface-director on said substrate, termed projected surface-director, presents a preferred orientation in a geometrical plane parallel to said substrate, termed preferred in-plane orientation, and a surface-director alignment layer comprising a chiral smectic liquid crystalline material arranged to interact with the bulk layer at said bulk surface, said surface-director alignment layer being a dynamic alignment layer directly controllable by an applied electric field to perform an in-plane switching in the surface-director alignment layer for accomplishing, as a direct consequence of this in-plane switching and the interaction at the bulk surface, an in-plane switching of said preferred in-plane orientation of the projected surface-director, wherein said liquid crystal bulk layer comprises a liquid crystalline material possessing a phase sequence consisting of isotropic phase, nematic phase and optionally crystalline phase(s), and the surface-director alignment layer comprises a chiral smectic liquid crystalline polysiloxane.

The liquid crystalline material of the liquid crystal bulk layer may comprise one or more, such as two, three or four, liquid crystal compound(s) (i.e. a mixture of liquid crystal compounds). It shall be understood that when a mixture of liquid crystal compounds is used, each individual compound as well as the mixture shall preferably possess a phase sequence consisting of isotropic phase, nematic phase and optionally crystalline phase(s).

Furthermore, the surface-director alignment layer may comprise one or more, such as two or three, chiral smectic liquid crystalline, polysiloxanes.

In addition, the surface-director alignment layer of the device disclosed herein may further comprise at least one other (second) liquid crystalline compound, such as a liquid crystalline dimeric siloxane compound, exemplified below with the compounds according to Formula V. It is neither required that the other liquid crystalline compound per se is smectic nor chiral, but a mixture of said chiral smectic polysiloxane and said other liquid crystalline compound should exhibit chiral smectic phase. The optional other liquid crystalline compound is, however, preferably a smectic, more preferably a chiral smectic, liquid crystalline compound.

Without being bound by any theory, it is believed that when a surface-director alignment layer comprising a chiral smectic liquid crystalline material, such as a SmC* liquid crystalline polysiloxane, is brought into contact with a liquid crystal bulk layer of a nematic liquid crystalline material possessing a phase sequence consisting of isotropic phase, nematic phase, and optionally crystalline phase(s), no third non-ferroelectric phase, such as SmA*/SmA or $SmC_A^*/SmC_A$, can be induced as a consequence of the contact between the alignment layer and the bulk layer.

That is, when said surface-director alignment layer comprises a SmC* liquid crystalline polysiloxane, only SmC*/SmC phase, nematic phase (N*/N) or a combination thereof can exist at ambient temperature. Thus, the initial phases of the bulk layer and surface-director alignment layer, respectively, are in this case preserved.

The same reasoning applies when a surface-director alignment layer comprising a SmA* liquid crystalline polysiloxane is brought into contact with a liquid crystal bulk layer of a nematic liquid crystalline material possessing a phase sequence consisting of isotropic phase, nematic phase, and optionally crystalline phase(s). That is, only SmA*/SmA phase, nematic phase or a combination thereof can exist at ambient temperature.

When a surface-director alignment layer comprising a $SmC_A^*$ liquid crystalline polysiloxane is brought into contact with a liquid crystal bulk layer of a nematic liquid crystalline material possessing a phase sequence consisting of isotropic phase, nematic phase, and optionally crystalline phase(s), a third ferroelectric phase of SmC* may be induced as a consequence of the contact between the alignment layer and the bulk layer when an electric field is applied.

The surface-director alignment layer in the device according to the invention may comprise a chiral smectic C (SmC* or $SmC_A^*$) or a chiral smectic A (SmA*) liquid crystalline polysiloxane.

The surface-director alignment layer preferably comprises a chiral smectic C (SmC*) liquid crystalline polysiloxane, more preferably a synclinic chiral smectic C (SmC*) liquid crystalline polysiloxane.

It is also believed to be advantageous to use a chiral smectic A (SmA*) liquid crystalline polysiloxane exhibiting random chiral smectic C phase (random SmC*) in the surface-director alignment layer. Generally, a comparatively low voltage is required for switching the molecules in random chiral smectic C phase.

The polysiloxane in the surface-director alignment layer of the device disclosed herein comprises chiral mesogenic side-chains attached to the polymeric backbone.

Polysiloxanes are advantageous in the surface-director alignment layer in the device disclosed herein since they exhibit a high mobility and a so-called micro-phase separation between the polymeric backbone and the mesogenic side-chains.

As used herein "mesogenic" refers to a chemical group having a rigid structure necessary for the molecules to exhibit a liquid crystal nature. A mesogenic side-chain may, for instance, comprise a biphenyl group.

As used herein a "side-chain" means a grouping of atoms that branches off from a straight-chain molecule, such as a polymeric backbone.

It shall be noted that the side-chains, preferably the mesogenic side-chains, of said polysiloxane may be fluorinated.

The surface-director alignment layer of a device disclosed herein preferably comprises a compound according to Formulas I-III.

Formula I

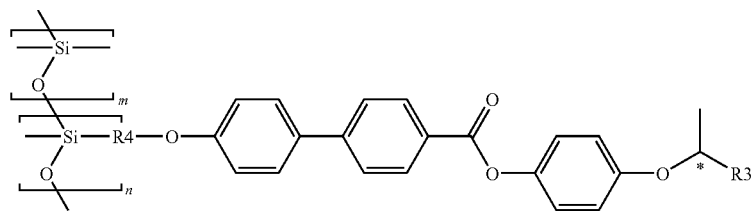

Formula II

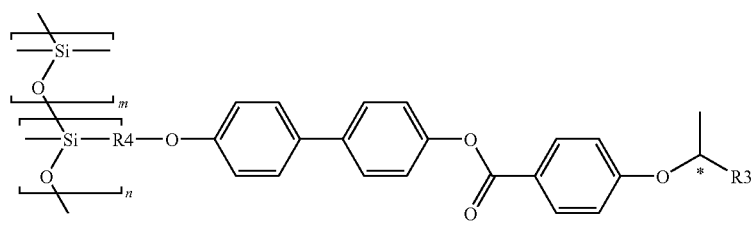

-continued

Formula III

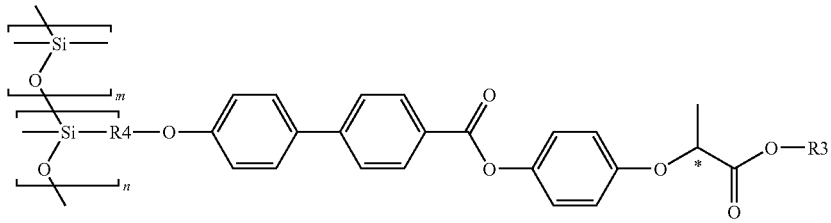

wherein R3 is an aliphatic hydrocarbon chain, such as an alkyl, preferably comprising 2 to 10 carbon atoms, and R4 is an alkylene of 2 to 20, preferably 5 to 14, methylene groups.

The siloxane polymers according to Formulas I-III are to be regarded as random copolymers, wherein the integers m and n may vary vastly. When m=0, homopolymers having mesogenic side-chains are obtained. The ratio m/n may suitably be within the range of from 15:1 to homopolymer, preferably from 5:1 to 1:1, such as 2.7:1. The average degree of polymerisation (i.e. monomer units per molecule) is preferably within the range of from 20 to 50.

A specific example of a preferred chiral smectic liquid crystalline polysiloxane for use in the surface-director alignment layer of the device disclosed herein is given by Formula IV.

crystalline siloxane compound having a dimeric structure, preferably a smectic liquid crystalline dimeric siloxane compound, more preferably a chiral smectic liquid crystalline dimeric siloxane compound.

Said dimeric siloxane compound may either be a low molecular siloxane compound or a polysiloxane.

Said smectic dimeric siloxane compound comprises mesogenic side-chains attached to the siloxane backbone and thus exhibits mesogenic side-chains located at each end of the siloxane backbone.

Examples of preferred dimeric siloxane compounds for use in the surface-director alignment layer of the device disclosed herein are given by Formula V.

Formula IV

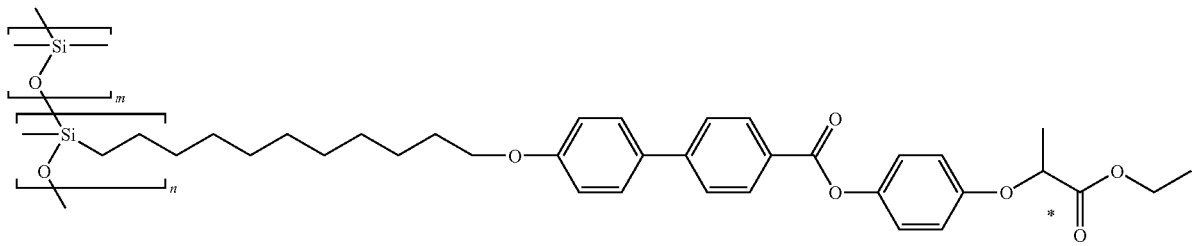

On heating, the polysiloxane according to Formula IV exhibits
  an electro-optically switchable SmC* phase from about −5° C.,
  a transition from SmC* to SmA at 105° C., and
  a transition from SmA to isotropic phase at 130° C.

Formula V

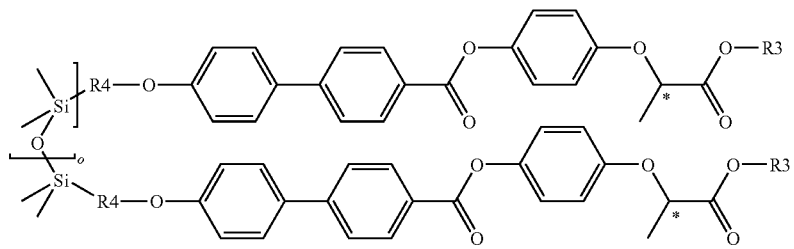

It has also been discovered that it, in some cases, may be advantageous that the surface-director alignment layer comprises, preferably in mixture, (i) at least one chiral smectic liquid crystalline polysiloxane, and (ii) at least one liquid wherein R3 is an aliphatic hydrocarbon chain, such as an alkyl, preferably comprising 2 to 10 carbon atoms, R4 is an alkylene of 2 to 20, preferably 5 to 14, methylene groups, and o is an integer, preferably from 3 to 150.

The siloxane compounds according to Formula V are to be regarded as siloxanes (or polysiloxanes) having dimeric structures.

The liquid crystal bulk layer in a device disclosed herein comprises an achiral or chiral nematic liquid crystalline material, preferably an achiral nematic liquid crystalline material.

The nematic liquid crystalline material of the bulk layer may be in a twisted or non-twisted configuration. Preferably, the liquid crystal bulk layer comprises a nematic liquid crystalline material exhibiting a negative dielectric anisotropy ($\Delta\varepsilon<0$).

The liquid crystal bulk layer of a device disclosed herein preferably comprises a fluorinated nematic liquid crystalline material.

Examples of fluorinated nematic liquid crystalline materials are given in WO 89/09203 and GB 2249309. Some of those materials may advantageously be used in the liquid crystal bulk layer in the device disclosed herein.

Said fluorinated nematic liquid crystalline material preferably comprises a fluorinated biphenyl or terphenyl compound, more preferably a fluorinated biphenyl compound.

The liquid crystal bulk layer of a device disclosed herein preferably comprises a compound according to Formula VI.

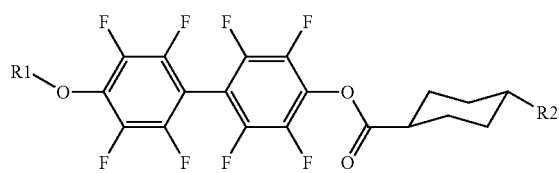

Formula VI wherein R1 and R2 each independently is an aliphatic hydrocarbon chain, such as an alkyl, preferably comprising 1 to 15 carbon atoms.

An example of a suitable nematic liquid crystalline material for use in a liquid crystal bulk layer in a device disclosed herein is the compound according to Formula VII.

On heating, the compound according to Formula VII exhibits a transition from nematic phase to isotropic phase at 103° C. The compound is believed not to exist in any other phase structure(s) with the exception of a potential crystalline phase (the transition temperature to a potential crystalline phase has not been determined).

On cooling, the nematic phase of the compound according to Formula VII is super-cooled at room temperature.

The compound according to Formula VII exhibits, in ordered phase, a negative dielectric anisotropy ($\Delta\varepsilon<0$).

The preparation of 2,2',3,3',5,5',6,6'-octafluoro-4'-n-octyloxy-biphenyl-4-yl trans 4-n-heptylcyclohexane-1-carboxylate (Formula VII) is described in Example 2 in WO 89/09203.

A second example of a liquid crystal bulk layer material suitable in a device disclosed herein is a mixture of the compounds according to Formula VIII, IX and X, such as 40% by weight of the compound of Formula VIII, 30% by weight of the compound of Formula IX, and 30% by weight of the compound of Formula X. This specific mixture is described in WO 89/09203 (Example 6).

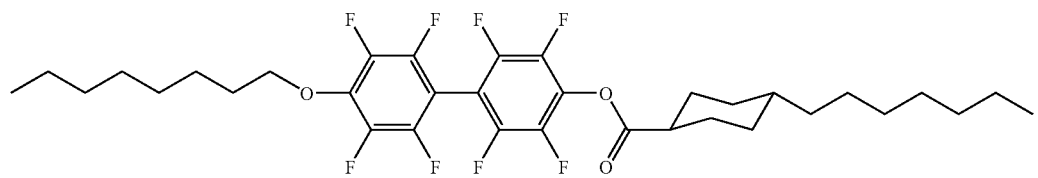

Formula VII

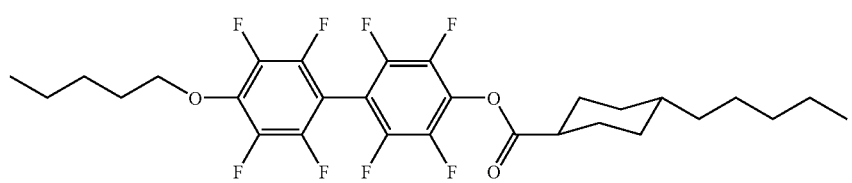

Formula VIII

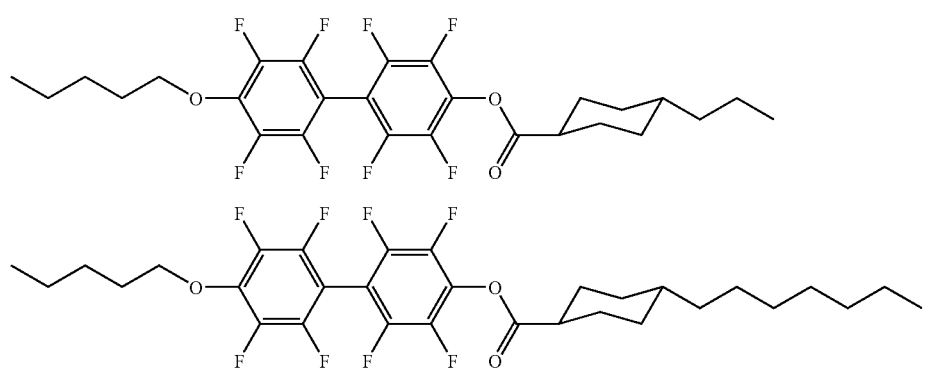

Formula IX

Formula X

On heating, the above described mixture (4:3:3) of the compounds according to Formulas VIII-X exhibits, according to WO 89/09203, a transition from nematic phase to isotropic phase at 102° C. The mixture is believed not to exist in any other phase structure(s) with the exception of a potential crystalline phase (the transition temperature to a potential crystalline phase has not been determined).

On cooling, the nematic phase of said mixture (4:3:3) of the compounds according to Formulas VIII-X is super-cooled at room temperature.

The dielectric anisotropy (As) of said mixture (4:3:3) of the compounds according to Formulas VIII-X is negative, $\Delta \in = -0.5$ at 20° C. according to WO 89/09203.

The refractive indexes of said mixture (4:3:3) of the compounds according to Formulas VIII-X are, at 589 nm and 20° C., $n_e=1.5723$ and $n_o=1.4499$ ($\Delta n=0.1224$) according to WO 89/09203.

The preparation of 2,2',3,3',5,5',6,6'-octafluoro-4'-n-pentyloxy-biphenyl-4-yl trans 4-n-pentylcyclohexane-1-carboxylate (Formula VIII), 2,2',3,3',5,5',6,6'-octafluoro-4'-n-pentyloxy-biphenyl-4-yl trans 4-n-propyl-cyclohexane-1-carboxylate (Formula IX), and 2,2',3,3',5,5',6,6'-octafluoro-4'-n-pentyloxy-biphenyl-4-yl trans 4-n-heptylcyclohexane-1-carboxylate (Formula X), respectively, is described in Example 2 in WO 89/09203.

The compound according to Formula VIII exhibits, according WO 89/09203, a transition from crystalline phase to nematic phase at 41.5° C., and a transition from nematic phase to isotropic phase at 112° C.

The compound according to Formula IX exhibits, according WO 89/09203, a transition from crystalline phase to nematic phase at 58.5° C., and a transition from nematic phase to isotropic phase at 105.3° C.

The compound according to Formula X exhibits, according WO 89/09203, a transition from crystalline phase to nematic phase at 59.5° C., and a transition from nematic phase to isotropic phase at 102° C.

A third example of a liquid crystal bulk layer material suitable in a device disclosed herein is a mixture (1:1:1) comprising 33.3% by weight of the compound of Formula VIII, 33.3% by weight of the compound of Formula IX, and 33.3% by weight of the compound of Formula X.

On heating, this mixture (1:1:1) of the compounds according to Formulas VIII-X exhibits a transition from crystalline phase to nematic phase at 25° C., and a transition from nematic phase to isotropic phase at 106.3° C. The mixture is believed not to exist in any other phase structure(s).

On cooling, the nematic phase of this mixture (1:1:1) of the compounds according to Formulas VIII-X is super-cooled at room temperature.

This mixture (1:1:1) of the compounds according to Formulas VIII-X exhibits, in ordered phase, a negative dielectric anisotropy ($\Delta \in <0$).

A fourth example of a liquid crystal bulk layer material suitable in a device disclosed herein is a mixture (1:1:1:1) comprising 25% by weight of the compound of Formula VIII, 25% by weight of the compound of Formula IX, 25% by weight of the compound of Formula X, and 25% by weight of the compound of Formula XI.

2,2',3,3',5,5',6,6'-octafluoro-4'-n-heptyloxy-biphenyl-4-yl trans 4-n-pentylcyclohexane-1-carboxylate (Formula XI) may be prepared in accordance with the description in WO 89/09203.

On heating, this mixture (1:1:1:1) of the compounds according to Formulas VIII-XI exhibits a transition from crystalline phase to nematic phase at 21° C., and a transition from nematic phase to isotropic phase at 104.8° C. The mixture is believed not to exist in any other phase structure(s).

On cooling, the nematic phase of this mixture (1:1:1:1) of the compounds according to Formulas VIII-XI is super-cooled at room temperature.

Formula XI

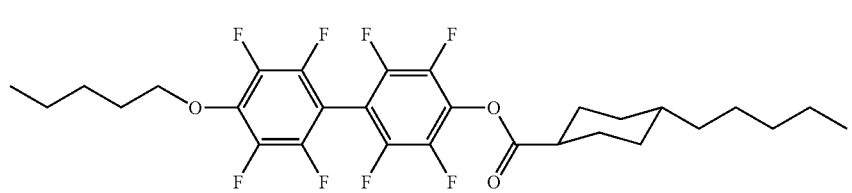

This mixture (1:1:1:1) of the compounds according to Formulas VIII-XI exhibits, in ordered phase, a negative dielectric anisotropy ($\Delta\varepsilon<0$).

A fifth example of a liquid crystal bulk layer material suitable in a device disclosed herein is a mixture (1:1) comprising 50% by weight of the compound of Formula VIII and 50% by weight of the compound of Formula XI.

On heating, this mixture (1:1) of the compounds according to Formulas VIII and XI exhibits a transition from crystalline phase to nematic phase at 32° C., and a transition from nematic phase to isotropic phase at 105.2° C. The mixture is believed to not exist in any other phase structure(s).

On cooling, the nematic phase of this mixture (1:1) of the compounds according to Formulas VIII and XI is supercooled at room temperature.

This mixture (1:1) of the compounds according to Formulas VIII and XI exhibits, in ordered phase, a negative dielectric anisotropy ($\Delta\varepsilon<0$).

The present disclosure also relates to a method for manufacturing a liquid crystal device disclosed herein, as described above, comprising providing a dynamic surface-director alignment layer comprising a chiral smectic liquid crystalline polysiloxane on an inner surface of at least one substrate, wherein the thus provided surface-director alignment layer is directly controllable by an electric field to perform an in-plane switching in the surface-director alignment layer, and sandwiching a liquid crystal bulk layer comprising a liquid crystalline material possessing a phase sequence consisting of isotropic phase, nematic phase and optionally crystalline phase(s) between two substrates, at least one of which is provided with said surface-director alignment layer, arranged so that said surface-director alignment layer(s) is (are) interacting with the liquid crystal bulk layer at a bulk surface thereof.

Generally, said inner surface of the substrate is coated with a (passive) orientation layer prior to providing the dynamic surface-director alignment layer thereon. This orientation layer provides an initial molecular orientation to the dynamic surface-director alignment layer.

For instance, an unidirectionally rubbed polymer layer, such as a rubbed polyimide layer, may be used as the passive orientation layer.

Alternatively, an orientation layer is provided on said inner surface of the substrate by coating the substrate surface with a material comprising molecules that can be aligned by light, said coating being performed prior to providing the dynamic surface-director alignment layer thereon. The molecules within said material is then aligned in a preferred direction by subjecting the material to light, preferably either before or after providing the dynamic surface-director alignment layer thereon.

A specific example of a material that can be used as the orientation layer in the above described embodiment is the compound according to Formula XII.

Formula XII

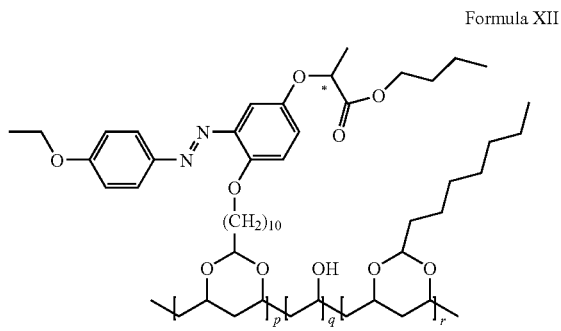

wherein (p+q)/r=43/18 and p/q=1.

Other examples of materials comprising molecules that can be aligned by light are well known to persons skilled in the art.

Still another alternative is to provide a dynamic surface-director alignment layer comprising molecules that can be aligned by subjecting the molecules to light. The molecules can be a polysiloxane that can be aligned by light or any other molecule(s) that is compatible in mixture with a suitable polysiloxane and that can be aligned by light.

The disclosed embodiments will now be illustrated by means of the following non-limiting examples.

EXAMPLES

Glass substrates having a thickness of 1.10 mm were used. One side of each substrate was coated with a trans-parent electrode layer of indium tin oxide (ITO) having a surface resistance of 80 $\Omega/cm^2$. Addressing electrode structures were provided using a conventional photolithography process known to persons skilled in the art.

The glass substrates were cut into pieces with a size of 14×12 mm and the edges were ground.

The ITO side of each substrate was thereafter spin coated with a polyimide solution to form a thin polyimide film on the ITO layer. The polyimide film was unidirectionally rubbed to form an orientation layer.

On the top of the polyimide film, a thin surface-director alignment layer of a ferroelectric liquid crystal polysiloxane (FLCP) was deposited from a 0.5% solution of the FLCP in tetrahydrofuran (THF) by means of spin coating technique. After deposition of the FLCP layer, the substrates were heated up to about 130° C. in order to get rid of the solvent, then slowly cooled to about 105° C. and kept at this temperature for about 15 minutes in order to align the chiral smectic FLCP molecules in bookshelf geometry by the rubbed polyimide film lying underneath. The FLCP layer was thereafter weakly rubbed unidirectionally to obtain a more uniform planar alignment of the FLCP molecules.

Two such glass substrates, one substrate being rotated 180° to make the buffing direction antiparallel in the cell, were assembled using a UV-curing glue (Norland NOA68) to a sandwich cell with their sides covered with the FLCP layer facing each other. The distance between the glass substrates was fixed by glass spacers (2.5 μm). The cell was put under pressure in an UV-exposure box for 15 minutes.

Small electric cords were ultra-sonically soldered to each ITO-surface of the cell.

A nematic liquid crystal, in isotropic phase, was then introduced into the cell gap by means of capillary forces (this can be done with or without vacuum applied), thus forming a nematic liquid crystal bulk layer.

It shall be noted that the device described above is of a relatively simple type. Devices can be of much larger size and can be addressed in different ways, such as by using a passive matrix-addressed type or an active matrix-addressed type. In these cases, steps involving complex microelectronics productions steps are involved.

Example 1

A cell was prepared as described above.

The FLCP used as surface-director alignment layer material was in this example the polysiloxane according to Formula IV.

The nematic liquid crystal used as liquid crystal bulk layer material was in this example the above described mixture (1:1) comprising 50% by weight of the compound of Formula VIII and 50% by weight of the compound of Formula XI.

FIG. 1 shows the electro-optic response of the above cell on application of an ac voltage of 50 V with a frequency of 200 Hz at room temperature (about 22° C.). The electric field was applied between the electrodes deposited onto the inner sides of the two substrates, i.e. across the FLCP alignment films and the liquid crystal bulk layer confined there between. The cell was inserted between two crossed polarisers oriented initially with its optical axis at 22.5 degrees with respect to the polariser.

FIG. 1a demonstrates that the electro-optical response was polar.

Figure 1B:
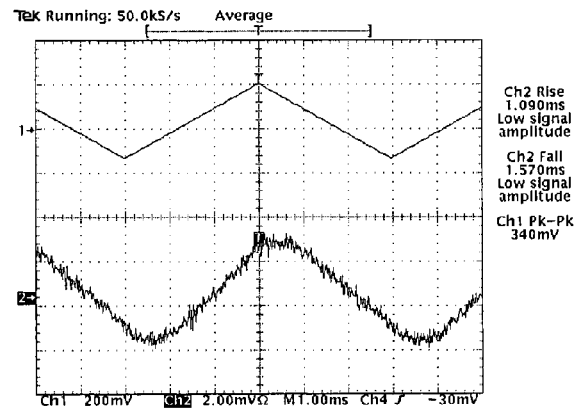

FIG. 1b demonstrates that said response was linear.

Figure 1C:
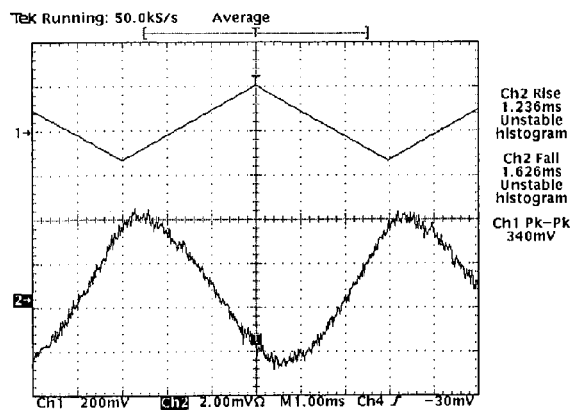

The cell was then rotated 45 degrees between the polarisers and the phase sign of said response was then inverted as shown in FIG. 1c. This indicated that the switching of the cell optic axis was in the plane of the cell (in-plane switching).

The induced deviation of the cell optic axis upon application of an electric field over the cell indicates the level of contrast obtainable for an image displayed by a liquid crystal display device comprising the cell. The larger the induced deviation, the larger is the modulation of light intensity transmitted through the cell and the higher the contrast of the image.

A method for measuring the in-plane induced deviation (tilt) of the cell optic axis is found in "Device physics of the soft mode electro-optic effect" by G Andersson, I Dahl, L Komitov, S T Lagerwall, K Skarp, B Stebler in Journal of Applied Physics, 66(10), p. 4983 (1989).

Using said method, the in-plane deviation of the cell optic axis of the cell described in this example was estimated to be about 6-8°.

Example 2

A cell was prepared according to Example 1 except that the above described mixture (1:1:1:1) comprising 25% by weight of the compound of Formula VIII, 25% by weight of the compound of Formula IX, 25% by weight of the compound of Formula X, and 25% by weight of the compound of Formula XI was used as nematic liquid crystal bulk layer material.

Figure 2A:
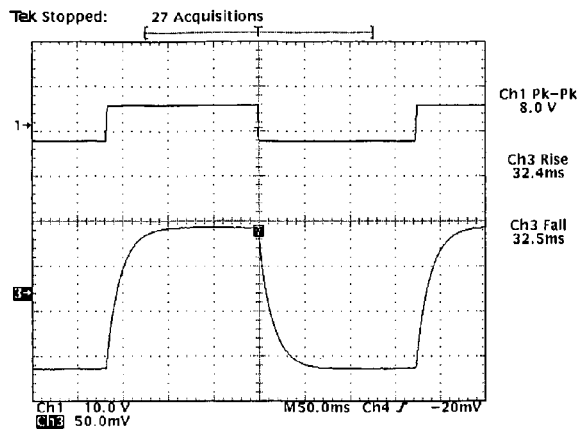
FIG. 2a-c shows the electro-optical response of the cell described in Example 2.
Figure 2B:
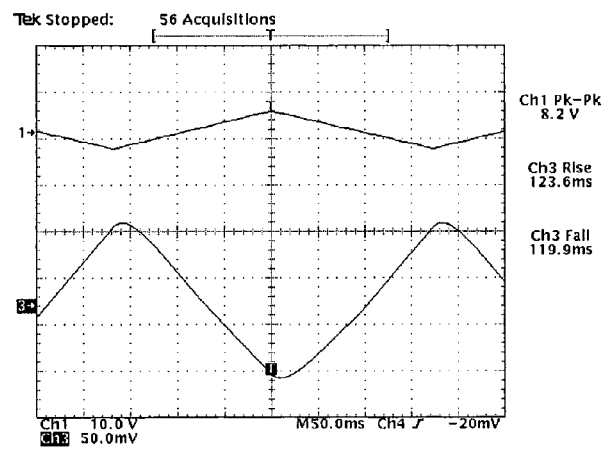
Figure 2C:
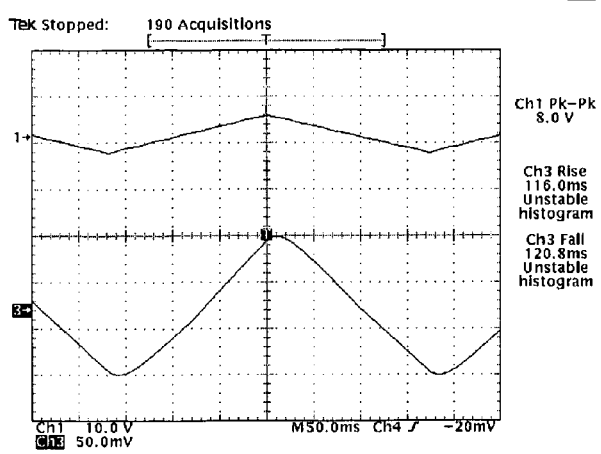

FIG. 2 shows the electro-optic response of this cell (in a similar fashion as FIG. 1 shows the response of the cell described in Example 1).

Using the above mentioned method, the in-plane deviation of the cell optic axis of the cell described in this example was estimated to be about 15-20°.

Example 3

A cell was prepared according to Example 1 except that ZLI 2585 (Merck) was used as nematic liquid crystal bulk layer material.

ZLI 2585 exhibits a transition from crystalline phase to nematic phase at a temperature below −20° C. (not measured), and a transition from nematic phase to isotropic phase at 70° C. The mixture is believed not to exist in any other phase structure(s).

ZLI 2585, in ordered phase, exhibits a negative dielectric anisotropy ($\Delta\epsilon<0$).

The detected electro-optic response of this cell was similar to the responses of Examples 1 and 2, thus an in-plane switching of the cell optic axis was demonstrated.

Using the above mentioned method, the in-plane deviation of the cell optic axis of the cell described in this example was estimated to be about 3-6°.

Comparison Example 1

As a comparison, reference is made to Example 6 of WO 00/03288, in which a cell comprising a surface-director alignment layer of a ferroelectric polyacrylate and a liquid crystal bulk layer of ZLI 2585 is described.

Using the above mentioned method, the in-plane deviation of the cell optic axis of this cell was estimated to be about 1-3°.

Comparison Example 2

As a comparison, a cell was prepared according to Example 1 except that the compound according to Formula XIII was used as nematic liquid crystal bulk layer material.

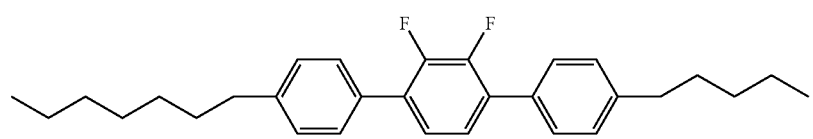

Formula XIII

On heating, the compound according to Formula XIII exhibits a transition from crystalline phase to nematic phase at 36.5° C. and a transition from nematic phase to isotropic phase at 111.5° C.

On cooling, the compound according to Formula XIII exhibits a transition from nematic phase to SmC at 24.0° C.

The compound according to Formula XIII exhibits, in ordered phase, a negative dielectric anisotropy ($\Delta\epsilon<0$).

No linear electro-optical response could be detected for this cell.

While the invention has been described in detail and with reference to specific embodiments thereof, it will be apparent for one skilled in the art that various changes and modifications can be made therein without departing from the spirit and scope thereof.

The invention claimed is:

1. A liquid crystal device comprising:
   at least one confining substrate,
   a liquid crystal bulk layer, comprising a liquid crystalline material possessing a phase sequence consisting of an isotropic phase and a nematic phase and, optionally, one or more crystalline phase(s), and presenting a surface director at a bulk surface thereof, wherein a projected surface-director, which comprises an orthogonal projection of said surface-director on said substrate, presents a preferred in-plane orientation, which comprises a preferred orientation in a geometrical plane parallel to said substrate, and a surface-director alignment layer comprising a chiral smectic liquid crystalline material, which comprises at least one chiral smectic liquid crystalline polysiloxane, arranged to interact with the bulk layer at said bulk surface, said surface-director alignment layer being a dynamic alignment layer directly controllable by an applied electric field to perform an in-plane switching in the surface-director alignment layer for accomplishing, as a direct consequence of this in-plane switching and the interaction at the bulk surface, an in-plane switching of said preferred in-plane orientation of the projected surface-director.

2. A device according to claim 1, wherein the surface-director alignment layer comprises a chiral smectic liquid crystalline polysiloxane exhibiting a phase structure selected from the group consisting of synclinic chiral smectic C (SmC*), anticlinic chiral smectic C (SmC$_A$*), and chiral smectic A (SmA*).

3. A device according to claim 2, wherein the surface-director alignment layer comprises a synclinic chiral smectic C (SmC*) liquid crystalline polysiloxane.

4. A device according to claim 2, wherein the surface-director alignment layer comprises a random chiral smectic C (random SmC*) liquid crystalline polysiloxane.

5. A device according to claim 1, wherein the polysiloxane is selected from the group consisting of the compounds according to Formulas I-III:

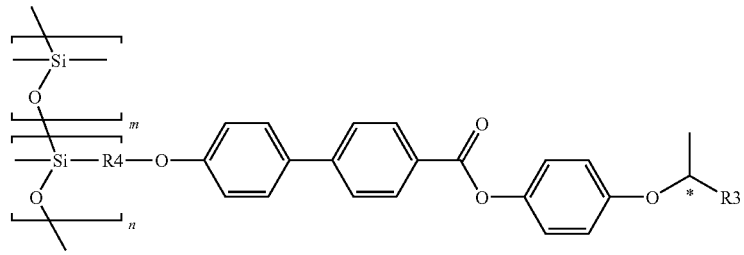

Formula I

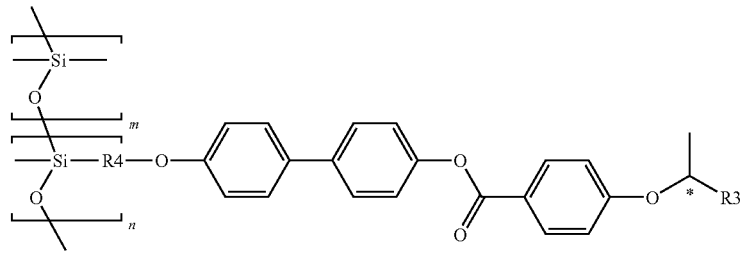

Formula II

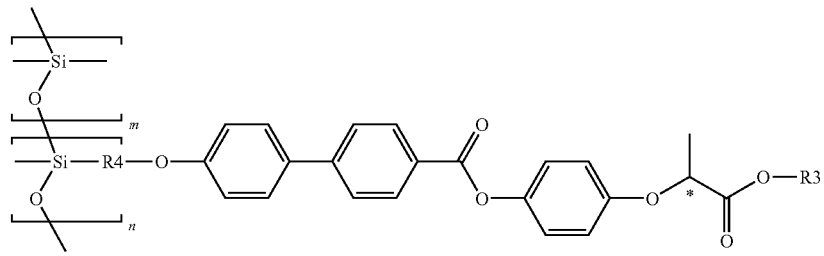

Formula III wherein R3 is an aliphatic hydrocarbon chain, R4 is an alkylene of 2 to 20 methylene groups, and m and n are integers.

6. A device according to claim 5, wherein the polysiloxane is a compound according to Formula IV:

Formula IV

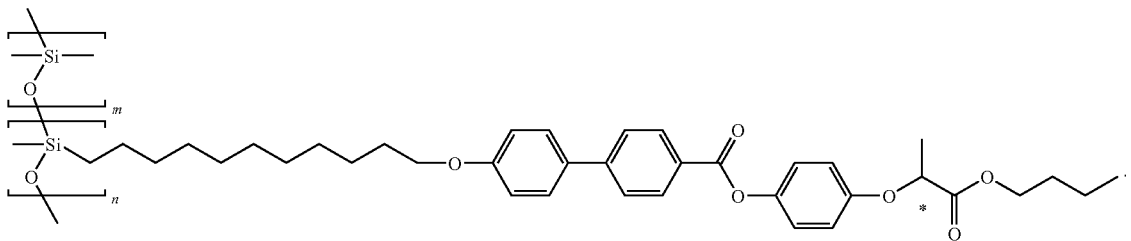

7. A device according to claim 1, wherein the surface-director alignment layer further comprises a smectic dimeric siloxane compound.

8. A device according to claim 7, wherein the smectic dimeric siloxane compound is chiral.

9. A device according to claim 8, wherein the chiral smectic dimeric siloxane compound is a compound according to Formula V:

Formula V

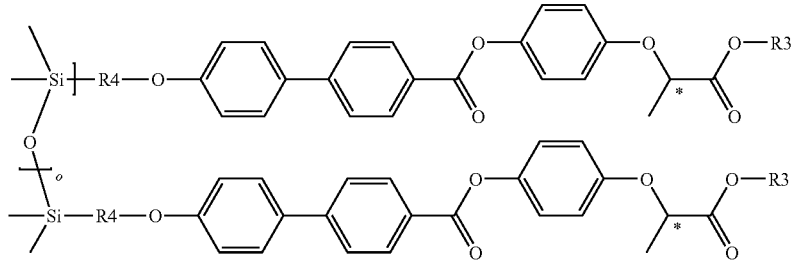

wherein R3 is an aliphatic hydrocarbon chain, R4 is an alkylene of 2 to 20 methylene groups, and o is an integer.

10. A device according to claim 1, wherein the liquid crystal bulk layer comprises an achiral nematic liquid crystalline material.

11. A device according to claim 1, wherein the liquid crystal bulk layer comprises a nematic liquid crystalline material exhibiting a negative dielectric anisotropy.

12. A device according to claim 1, wherein the liquid crystal bulk layer comprises a fluorinated nematic liquid crystalline material.

13. A device according to claim 12, wherein the fluorinated nematic liquid crystalline material comprises at least one fluorinated biphenyl compound.

14. A device according to claim 12, wherein the fluorinated nematic liquid crystalline material comprises at least one fluorinated terphenyl compound.

15. A device according to claim 13, wherein the fluorinated biphenyl compound is a compound according to Formula VI:

Formula VI

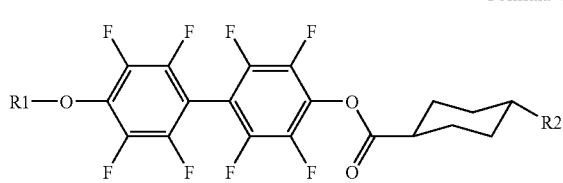

wherein R1 and R2 each independently is an aliphatic hydrocarbon chain.

16. A device according to claim 15, wherein the fluorinated nematic liquid crystalline material comprises one or more fluorinated biphenyl compound(s) selected from the group consisting of the compounds according to Formulas VII-XI:

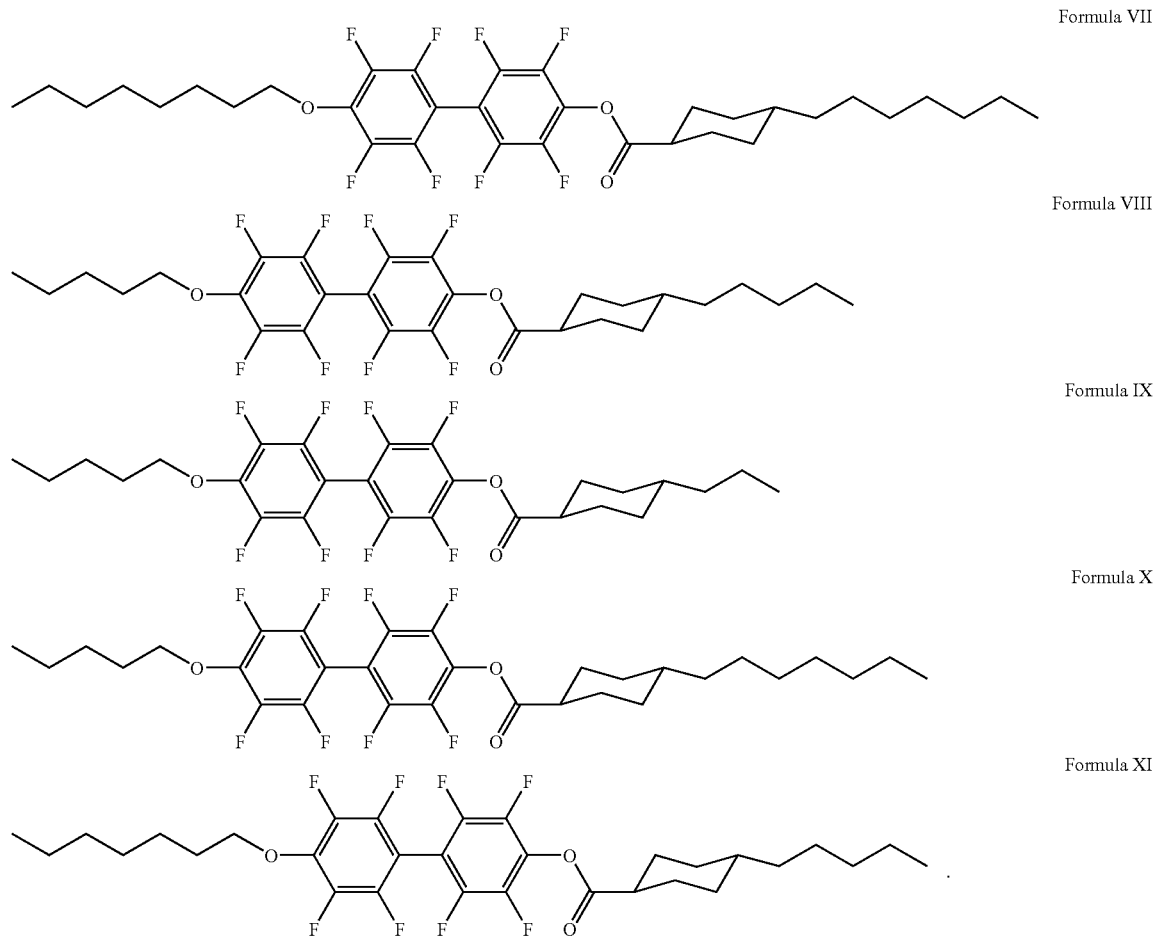

Formula VII

Formula VIII

Formula IX

Formula X

Formula XI

17. A method for manufacturing a liquid crystal device according to claim 1 comprising:

provinding a dynamic surface-director alignment layer comprising at least one chiral smectic liquid crystalline polysiloxane on an inner surface of at least one substrate, wherein the thus provided surface-director alignment layer is directly controllable by an electric field to perform an in-plane switching in the surface-director alignment layer, and sandwiching a liquid crystal bulk layer comprising a liquid crystalline material possessing a phase sequence consisting of isotropic phase, nematic phase and, optionally, one or more crystalline phase(s) between two substrates, at least one of which is provided with said surface-director alignment layer, arranged so that said surface-director alignment layer(s) is (are) interacting with the liquid crystal bulk layer at a bulk surface thereof.

* * * * *